(12) United States Patent
Phillips

(10) Patent No.: US 10,929,441 B1
(45) Date of Patent: Feb. 23, 2021

(54) SYSTEM AND TECHNIQUES FOR DATA RECORD MERGING

(71) Applicant: Capital One Services, LLC, McLean, VA (US)

(72) Inventor: Carolyn Phillips, Chicago, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/805,158

(22) Filed: Feb. 28, 2020

(51) Int. Cl.
*G06F 16/20* (2019.01)
*G06F 16/28* (2019.01)
*G06F 16/215* (2019.01)
*G06F 16/2455* (2019.01)
*G06F 16/25* (2019.01)

(52) U.S. Cl.
CPC .......... *G06F 16/288* (2019.01); *G06F 16/215* (2019.01); *G06F 16/2456* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 5,446,908 A * | 8/1995 | Kevorkian | ............ | G06F 17/12 700/89 |
| 7,627,550 B1 * | 12/2009 | Adams | ............ | G06F 16/24556 |
| 7,987,250 B2 * | 7/2011 | Pai | ............ | G06K 9/6224 370/254 |
| 8,498,998 B2 * | 7/2013 | Eshwar | ............ | G06F 16/2465 707/765 |
| 2011/0173093 A1 * | 7/2011 | Psota | ............ | G06Q 30/06 705/26.35 |
| 2013/0212103 A1 * | 8/2013 | Cao | ............ | G06F 16/215 707/737 |
| 2016/0132496 A1 * | 5/2016 | Gandhi | ............ | G06F 16/244 707/754 |

* cited by examiner

*Primary Examiner* — Belix M Ortiz Ditren
(74) *Attorney, Agent, or Firm* — Kacvinsky Daisak Bluni PLLC

(57) ABSTRACT

A non-transitory computer-readable storage medium is provided to store computer-readable program code to receive an unmerged record set, comprising a first plurality of data records, to generate record-pairs from the first plurality of data records, based upon a set of transitive deterministic matching criteria, apply a set of non-transitive matching rules to the record-pairs, perform a partitioning operation on the record-pairs, using a plurality of independent grouping operations, wherein a plurality of matched record groups are generated. The computer-readable program code may determine a set of maximal connected components from the plurality of matched record groups, perform a merge operation on the set of maximal connected components to generate a set of merged records, the set of merged records comprising a second plurality of data records, less than the first plurality of data records, and send the merged records for storage in a non-transitory computer readable storage medium.

19 Claims, 7 Drawing Sheets

Fig 3

Records

| | Attribute 1 | Attribute 2 | Attribute 3 | Attribute 4 |
|---|---|---|---|---|
| Record 1 | A1 | B1 | C1 | D1 |
| Record 2 | A1 | B2 | C1 | D2 |
| Record 3 | A1 | B3 | C3 | D3 |
| Record 4 | A1 | B3 | C4 | D4 |

| Record-Pairs | | Shared Attribute 1 | T-DC | NT-DC | PC | MATCH |
|---|---|---|---|---|---|---|
| Record 1 | Record 2 | A1 | Y | Y | Y | Y |
| Record 1 | Record 3 | A1 | Y | N | N | N |
| Record 1 | Record 4 | A1 | Y | N | N | N |
| Record 2 | Record 3 | A1 | Y | N | N | N |
| Record 2 | Record 4 | A1 | Y | N | N | N |
| Record 3 | Record 4 | A1 | Y | Y | Y | Y |

Transitive Deterministic Criterion (T-DC):
"Records must match on Attribute 1" 

Non-Transitive Deterministic Criterion (NT-DC):
"Records must match on Attribute 2 or Attribute 3" 

Probabilistic Criterion (PC):
"A weighted attribute-attribute match scoring function must exceed a threshold of 0.5" 

Full Matching Requirement:
"If two records meet the T-DC, NT-DC, and PC criteria, then they match" 

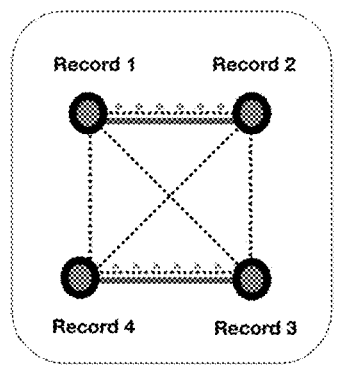
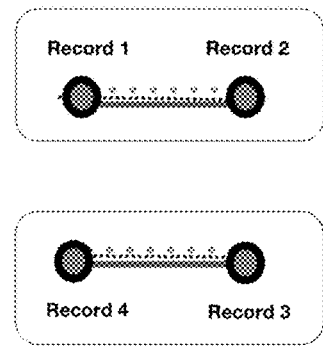
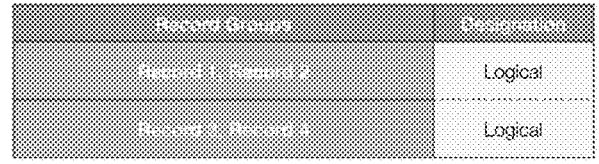

Fig 4A
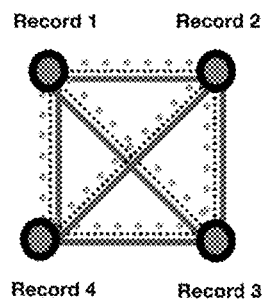
Fig 4B
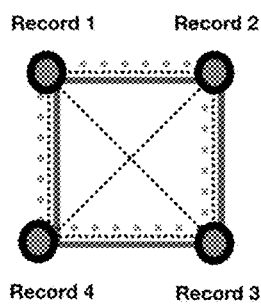
Fig 4C
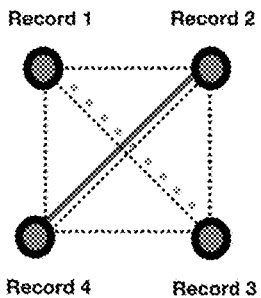
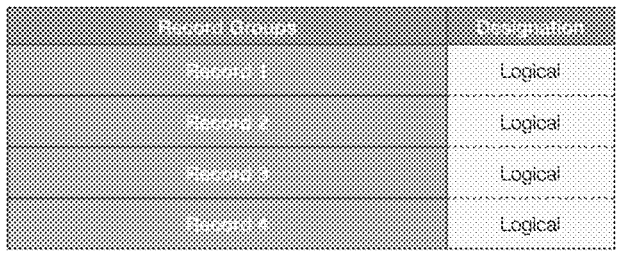

$$F(\overset{A}{\bullet}, \overset{B}{\bullet}, \overset{C}{\bullet}) = \overset{D}{\bullet}$$
*FIG.5B*
*FIG.6A*     *FIG.6B*     *FIG.6C*
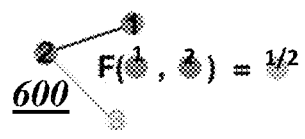     -Or-     
$$F(\overset{A}{\bullet}, \overset{B}{\bullet}, \overset{C}{\bullet}) = ?=? \quad F(F(\overset{A}{\bullet},\overset{B}{\bullet}),\overset{C}{\bullet}) \quad ?=? \quad F(\overset{A}{\bullet}, F(\overset{B}{\bullet}, \overset{C}{\bullet}))$$
*FIG.6D*
*FIG.6E*

US 10,929,441 B1

SYSTEM AND TECHNIQUES FOR DATA RECORD MERGING

TECHNICAL FIELD

Embodiments herein generally relate to record management, in particular, record merging to deduplicate data records.

BACKGROUND

Many entities including governmental organizations, private financial services providers, health care providers, and so forth, maintain large databases of records, such as customer, client or patient records. Notably, in entities maintaining many thousands or millions of records, duplicate records for the same customer may unnecessarily add to storage requirements, and add to the complexity of managing an account for a given customer. Accordingly, automated techniques for deduplicating records have been developed, which techniques may be provided in so called entity resolution systems. To date, these entity resolution systems may lack the ability to be interrogated to determine how decisions are made to arrive at a final entity after deduplication. Moreover, these entity resolution systems may not provide a means to identify problematic entities uncovered during the deduplication process for further review. In addition, known entity resolution systems may lack auditability to generate comparative metrics against a different entity resolution system.

With respect to these and other considerations, the present disclosure is provided.

BRIEF SUMMARY

In one embodiment, a non-transitory computer-readable storage medium is provided to store computer-readable program code. The computer-readable program code may be executable by a processor to receive an unmerged record set, comprising a first plurality of data records, perform a record-pairing operation to generate a set of record-pairs from the first plurality of data records, based upon a set of transitive deterministic matching criteria, apply a set of non-transitive matching rules to the set of record-pairs, perform a partitioning operation on the set of record-pairs, using a plurality of independent grouping operations, wherein after application of the set of non-transitive matching rules and the partitioning operation, a plurality of matched record groups are generated. The computer-readable program code may be executable by the processor to determine a set of maximal connected components from the plurality of matched record groups, perform a merge operation on the set of maximal connected components to generate a set of merged records, the set of merged records comprising a second plurality of data records, less than the first plurality of data records, and send the merged records for storage in a non-transitory computer readable storage medium.

In another embodiment, a method of merging a record set is provided. The method may include receiving an unmerged record set, comprising a first plurality of data records, performing a record-pairing operation on the unmerged record set to generate a set of record-pairs from the first plurality of data records, based upon a set of transitive deterministic matching criteria, applying a set of non-transitive matching rules to the set of record-pairs, and performing a grouping operation on the set of record-pairs, wherein after the performing the grouping operation and the applying the set of non-transitive matching rules, a set of record groups that constitute a set of maximal connected components is generated. The method may include performing a merge operation on the set of maximal connected components to generate a set of merged records, the set of merged records comprising a second plurality of data records, less than the first plurality of data records, and sending the set of merged records for storage in a non-transitory computer readable storage medium.

In a further embodiment, a system is provided, including a processor and a memory storing instructions executable by the processor to receive an unmerged record set, comprising a first plurality of data records, perform a record-pairing operation to generate a set of record-pairs from the first plurality of data records, based upon a set of transitive deterministic matching criteria, apply a set of non-transitive matching rules to the set of record-pairs, perform a partitioning operation on the set of record-pairs, wherein after application of the set of non-transitive matching rules and the partitioning operation, a plurality of matched record groups are generated. The instructions may further be executable on the processor to generate a set of maximal connected components by sorting the matched record group into cliques and not-cliques via a numerical test, wherein a record group constitutes a clique when immediately classifiable as a logical record group, wherein a record group constitutes a not-clique when a more computationally expensive operation is required to classify the record group into a logical or illogical record group, and perform a merge operation on the set of maximal connected components to generate a set of merged records, the set of merged records comprising a second plurality of data records, less than the first plurality of data records.

BRIEF DESCRIPTION OF THE DRAWINGS

FIG. 3 illustrates a first configuration of a series of data records, yielding a plurality of logical groups.

FIG. 4A illustrates a second configuration of a second series of data records, yielding one logical group.

FIG. 4B illustrates a third configuration of series of data records, yielding one illogical group.

FIG. 4C illustrates a fourth configuration of series of data records, yielding four logical groups.

FIG. 5B illustrates a merge operation for the records of the group of FIG. 6A.

FIG. 6A-6E illustrate ambiguities in final outcome when records are merged pair-wise in order at the time of computing a match.

DETAILED DESCRIPTION

Figure 1:
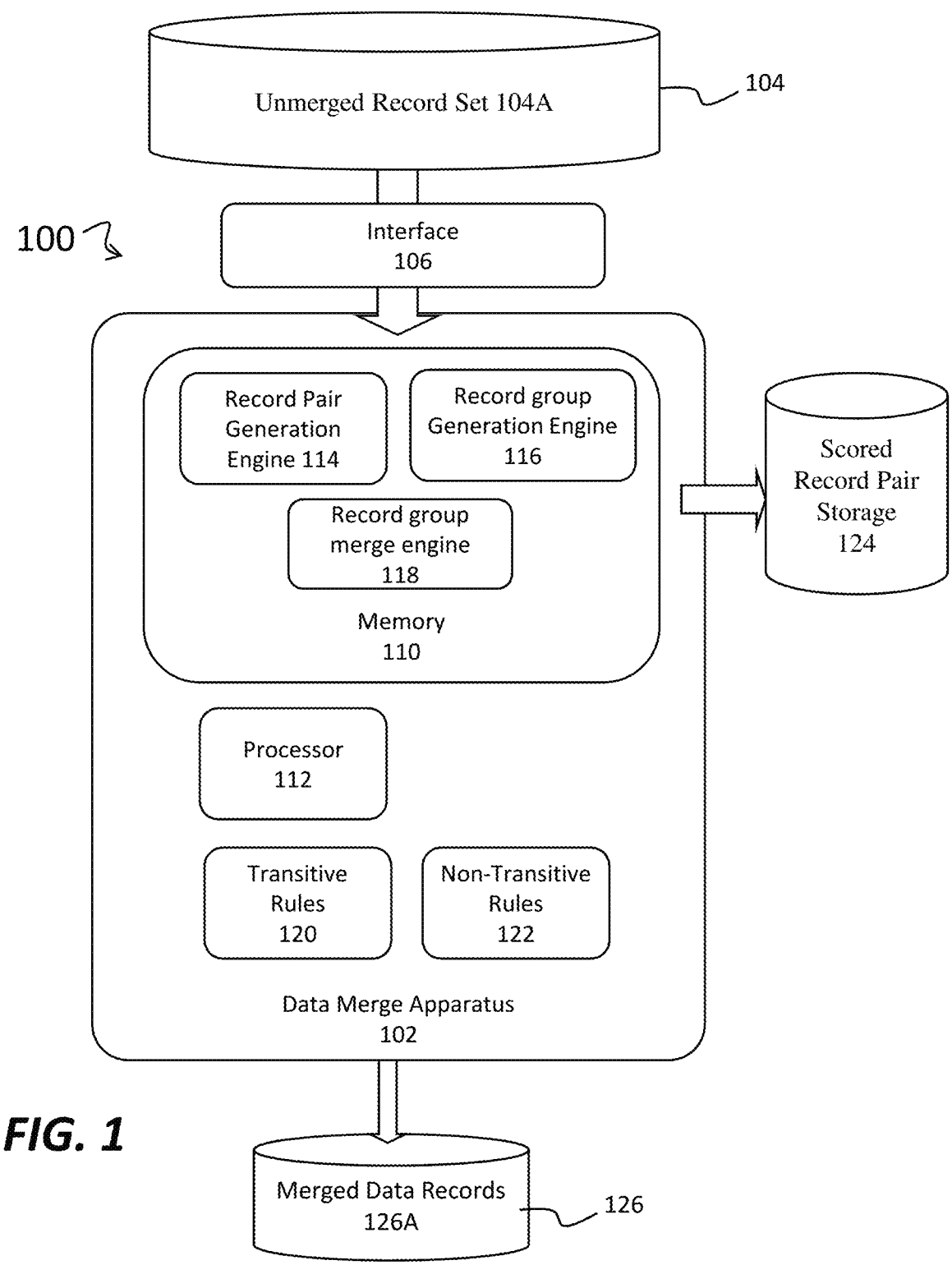
FIG. 1 illustrates an embodiment of a system.

Embodiments disclosed herein provide a system and techniques to collapse or deduplicate data records. Such techniques may be classified as a type of entity resolution process. Various non-limiting embodiments may be especially applicable to systems treating or storing large volumes of data records, such as tens of thousands, hundreds of thousands, millions, tens of millions, or hundreds of millions of data records.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough under-standing thereof. It may be evident, however, that the novel embodiments can be practiced without these specific details. In other instances, well known structures and devices are shown in block diagram form in order to facilitate a description thereof. The intention is to cover all modification, equivalents, and alternatives within the scope of the claims.

FIG. 1 depicts a schematic of an exemplary system, labeled an entity resolution system 100, consistent with disclosed embodiments. The entity resolution system 100 may represent an assembly of different systems and/or devices, including a data records system for an organization, such as a business, governmental body, services provider, social organization, and the like. The embodiments are not limited in this context, however. The entity resolution system 100 may facilitate one-time or repeated data deduplication to reduce the number of records handled or maintained by a given organization.

The entity resolution system 100 may generally employ one or more computing systems, networks, and storage devices according to various embodiments. computer, or other electronic device. The entity resolution system 100 may collapse data, by coupling to a source of data, such as a storage device 104, where the storage device 104 may represent a non-transitory computer readable medium for storing an unmerged record set 104A. In various embodiments, the unmerged record set 104A may represent a set of records related to multiple customers, clients, patients, or other entities. The unmerged record set 104A may include a plurality of data records, where at least some of the plurality of data records may include multiple records for the same entity. In some examples, the multiple records for a given entity may have similar structure or features, while differing in at least one aspect. In accordance with embodiments of the disclosure, discussed in detail below, the entity resolution system 100 may deduplicate the unmerged record set 104A to generate a merged record set 126A, or similar merged record set, for storage in a storage device 126, similar to storage device 104, or in some cases being the same storage device.

As shown in FIG. 1, the entity resolution system 100 may include a data merge apparatus 102, representing at least one computing device, for performing various operations to collapse the unmerged record set 104A, as well as process records, generate reports, collect statistics concerning records or parameters derived during the processing of the unmerged record set 104A, and so forth. The data merge apparatus 102 may be coupled to the unmerged record set 104A via an interface 106. The data merge apparatus 102 may include a processor 112, such as a microprocessor, as well as a memory 110. The memory 110 may be embodied as a non-transitory computer-readable storage medium storing computer-readable program code executable by the processor 112 to perform various operations, detailed hereinbelow. In accordance with various embodiments, the data merge apparatus 102 may include a record-pair generation engine 114, record group generation engine 116, and record group merge engine 118, among other components. In certain embodiments, these components may be embodied as instructions or program code, included in the memory 110.

As shown in FIG. 1, the entity resolution system 100 may store sets of rules for performing various data merge operations, including a transitive rule set 120, where the rules are comprised of transitive deterministic criteria, and non-transitive rules set 122, to be applied by the aforementioned engines of data merge apparatus 102, where the non-transitive rules may be comprised of non-transitive deterministic matching criteria and non-transitive probabilistic matching criteria (such as a non-transitive probabilistic matching model. In some embodiments, the transitive rule set 120 and non-transitive rules set 122 may be included in the record-pair generation engine 114 and the record group generation engine 116, respectively.

As such, the data merge apparatus 102 may function to receive an unmerged record set that includes a first plurality of data records, and perform a record-pairing operation to generate a set of record-pairs from the first plurality of data records, based upon a set of transitive rules, and subsequently apply the non-transitive rules. As detailed below, the data merge apparatus 102 may further perform a partitioning operation on the set of record-pairs, to subdivide the initial whole set of records into the minimal subsets of records and record-pairs required to process individual record-groups. The data merge apparatus may further sort these subsets into those that represent cliques, and thus represent final record groups, and those that do not represent cliques, and thus require additional processing to resolve into one or more record groups. The data merge apparatus may further classify final record groups as logical, if the final record group is a maximal clique, or illogical, if the final record group is a maximal connected component that is not a clique. The data merge apparatus 102 may also perform a merge operation on the set of logical or illogical record groups to generate a set of merged records and may be coupled to a data storage 124. As such, the set of merged records constitute a second plurality of data records that is less than the first plurality of data records.

Figure 2:
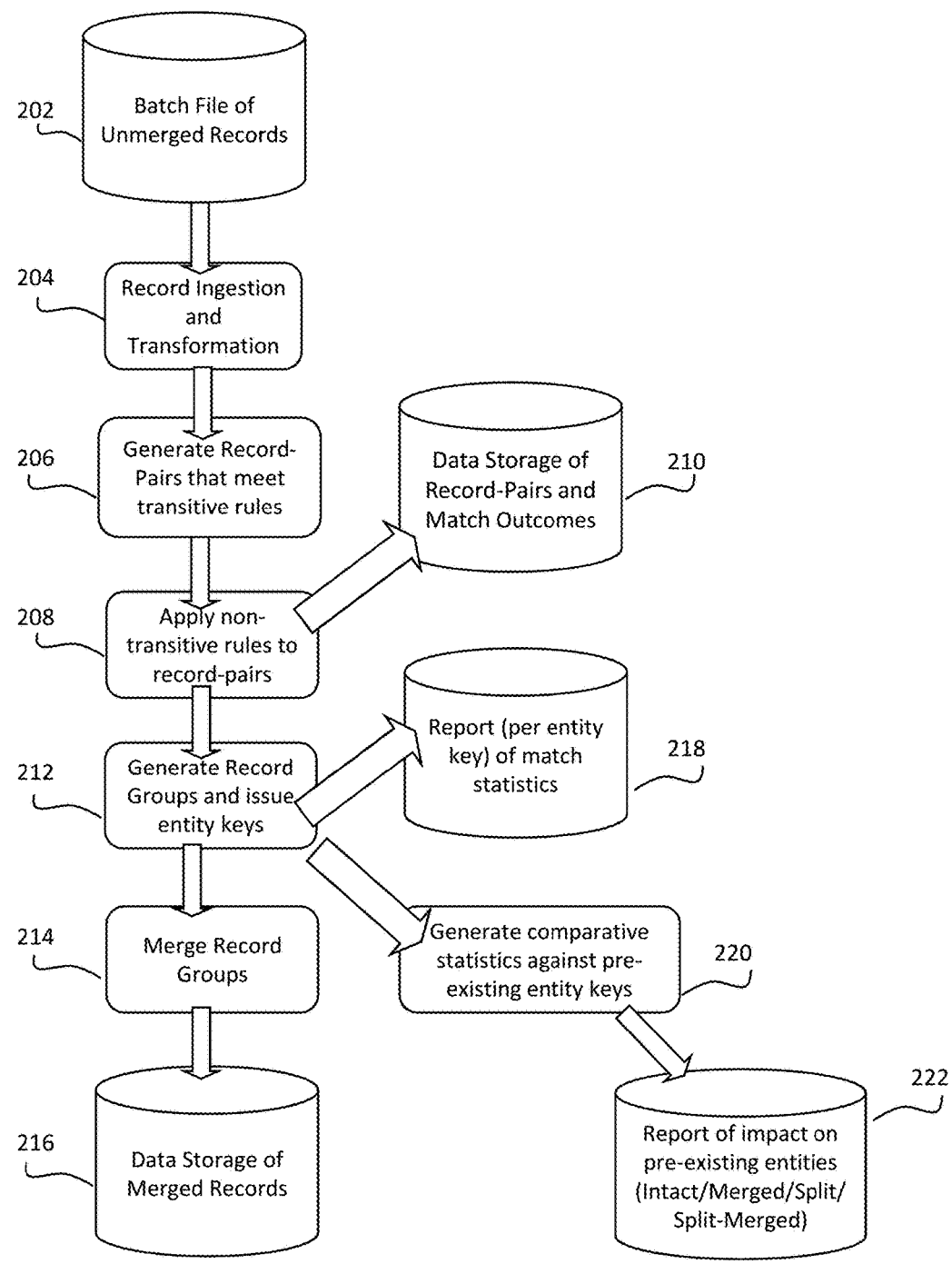
FIG. 2 illustrate an embodiment of a first logic flow.

FIG. 2 illustrates an embodiment of a first logic flow, shown as logic flow 200. At block 202 a batch file of a set of unmerged records is received. The unmerged record set may include all records related to a specific organization, such as all members of a health care system or all customers of a financial services organization, in two non-limiting embodiments. As such, the unmerged record set may include many records where duplicate records for the same entity, such as a member, client, or customer, exist. In large organizations, where records for many thousands of entities may exist, the unmerged records received at block 202 may be representative of a complex distribution of records. As an example, in consumer records of some large financial services organizations, 50%-60% of entities, such as a entries representing a given customer, may be represented by a single record, 20% of entities by two records, 10% by three records, 5% by four records, and so forth. A handful of entities may be each represented by hundreds or thousands of records. While reducing the number of records to just one for a given customer may be useful, in such an unmerged record set, two different records for the same entity may differ in one or more aspect from one another. Thus, record merging to reduce the total number of records may be challenging in order to properly identify and group related records, while not mis-classifying records, resulting in possible loss of an entity, for example. In accordance with embodiments of the disclosure, the logic flow 200 provides a novel and inventive approach to record merging.

Turning to block 204, ingestion and data transformation is performed on the unmerged record set. At this stage, the total number of records of the unmerged record set may remain the same as the original number of records received at block 202.

At block 206, record-pairs are generated from the unmerged records, based upon a transitive rule set, described in more detail below. Continuing to block 208, the remaining non-transitive rules are applied to the record-pairs that were generated at block 206. In optional block 210, record-pairs that meet transitive rule set, whether or not the record pairs pass the full match criteria, may be sent for storage, such as in a database, in any convenient non-transitory computer-readable storage medium.

Just record-pairs that meet the full match criteria in block 208 now flow to block 212. In block 212, a plurality of record groups are generated from the record-pairs, where each record group is believed to be a single entity and the record group is assigned a unique entity key. After block 212, in block 214, the record groups are merged, wherein the total number of records is reduced. Proceeding to block 216, after the merging of record groups, data storage takes place in a non-transitory computer readable storage medium.

In optional block 218, after block 212, a report is generated, based upon the results of the grouping of logic flow 200. The report may include (per entity key), the number of grouped records the number of matched record-pairs, the fraction of record-pairs that did not match, among other features. The record group metrics are stored in a non-transitory computer readable storage medium.

In optional block 220, after block 212, record group metrics are compared with a predetermined known record grouping method. Here the record groups generated according to logic flow 200 may be compared to the results of record grouping using a pre-existing record-linkage procedure or a pre-existing grouping determination of unknown procedure that has divided the same set of records into an alternate grouping, to generate comparison statistics. This operation is used to evaluate the impact of the logical flow on the unmerged record group relative to an alternate grouping. Here statistics are generated comparing the results of the logic flow to a known grouping procedure, including a statistical description of what fraction of the known groups are the same, what fraction of the known groups have merged, what fraction of the known groups have split, and what fraction of the known groups have both split and merged. In one embodiment, the flow may then proceed to block 222, where a report is made of these statistics.

Considering block 206 in more detail, according to various embodiments, an unmerged set of records may be evaluated to generate a set of record-pairs, where each record-pair must meet the transitive rules, which rules are transitive deterministic matching criteria. Transitive deterministic matching criteria are defined as deterministic matching criteria that satisfy the transitive property, that is, if Record 1 and Record 2 meet the criteria, and Record 2 and Record 3 meet the criteria, then Record 1 and Record 3 will always also meet the criteria. As an example, records may be required to share a tax identifier, where the tax identifier has one definition per record. "Sharing a TAX ID" constitutes transitive deterministic matching criteria. If Record 1 and Record 2 share a tax identifier and Record 2 and Record 3 share a tax identifier, then record 1 must also always share that tax identifier with Record 3. Once a pair of records is determined to meet transitive deterministic matching criteria, a record-pair from those records may be generated.

In addition, a set of non-transitive rules may be applied to record-pairs as in block 208. In some embodiments, non-transitive deterministic matching, probabilistic matching (which procedure is implicitly non-transitive), or a combination of non-transitive deterministic and probabilistic matching may be applied. A non-transitive deterministic criterion is a deterministic criterion that is not guaranteed to satisfy the transitive property. For example, if deterministic matching criteria is that two records are required to share one of attributes A, B, or C, this requirement does not meet the transitive property. If Record 1 and Record 2 may share A, and Record 2 and Record 3 may share B, there is no guarantee that Record 1 and Record 3 share any attribute A, B, or C.

Generally, for either transitive or non-transitive deterministic matching, either unique identifiers for each record are compared to determine a match or an exact comparison is used between fields that are likely to be nearly unique to an entity. Unique identifiers can include national IDs, system IDs, and so on. Nearly unique identifiers may include personal attributes such as name or phone number. In probabilistic matching several field values may be compared between two records where each field-comparison is assigned a score that indicates how closely the two field values match. A mathematical method, for example, a weighted sum or decision tree, may be used to convert the set of field-comparison scores to a likelihood of a match between two records, and may thus generate a scored record-pair from the two records.

Following the aforementioned consumer record example, a transitive deterministic match criterion may include an exact match on date-of-birth AND last name, while a non-transitive deterministic criteria may include matching on phone number, email address, OR IP address. A probabilistic criterion may score the similarity of two names or system access patterns.

In accordance with various embodiments of the disclosure, after application of non-transitive matching rules to the set of record-pairs, the record-pairs may then be aggregated to facilitate the generation of groups of records that represent single entities. Additionally, each group of records can then be classified as a logical group or illogical group, as explained below. In particular embodiments, records are formed into record-pairs that meet the transitive deterministic criterion (e.g. share the same date of birth (DOB)). Next, the record-pairs are assessed as to whether they meet the non-transitive matching criteria and record-pairs that do not can be removed from further processing. The remaining record-pairs may then be uniquely partitioned, where all record-pairs in a partition have met the same instance of the transitive deterministic matching criterion (e.g. all share a specific DOB). Partitioning can be implemented as an efficient bulk operation because the transitive deterministic criteria can be converted to a record-pair key that is assigned to each record-pairs (e.g. the DOB the records share). Multiple record-pairs that share the record-pair key are put in the same partition. Partitions of record-pairs and their associated records can then be processed independently and divided into one or more record groups. Last, each record group is determined either to be logical or illogical.

Considering block 206 and block 208 in more detail, since the work of processing all the record-groups is divided up by partitioning the record-pairs, all records that occur in no record-pair must be accounted for separately. By definition, these records belong to single record groups. These records may be easily identified as the set of all records that are not in the set of all records found in a record-pair. These records may be identified in as part of block 208 or over multiple steps in block 206 and 208.

The primary reason, according to this embodiment, that the criteria for matching records are divided over multiple steps, represented as blocks 206, 208, and 212, is to facilitate the scaling of the generation of record-groups to a large volume of unmerged record-groups. Using the language of graph theory, records are nodes, and matched record-pairs are edges connecting nodes. The initial set of all unmerged records is a graph. Notably, computing the full match criteria over every possible pair of records, or every edge in the whole graph, is computationally unfeasible. The transitive deterministic match criteria, or transitive rules, which rules can be expressed as pairing records that share a common key (e.g. the value that they must exactly match on), can be implemented in a scalable way. The generation of the partitions of the record-pairs (record-pair partitions) that also share a common key, which partition divides the computation into hundreds to thousands to millions of sub-problems, or the original graph into millions of independent subgraphs, where each can be processed independently, also facilitates implementation in a scalable way. Distributing the full match criteria over multiple steps constitutes an approach that allows the record-grouping logic flow to be implemented in a scalable manner for data sets of millions to hundreds of millions of unmerged records.

Turning to FIG. 3 there is shown one example of processing a set of four records. The top portion of FIG. 3 shows a table listing possible attributes of the four records, and a table listing six possible record pairs for the four records based upon an attribute A1. Notably, in various embodiments, this set of four records may have been drawn from a large record set, such as a set of one million records. Generally, matching of records may be accomplished by meeting of a full match criteria, including one or more of: transitive criteria, non-transitive criteria, deterministic criteria, and probabilistic criteria.

An example is given of a transitive deterministic match criterion, a non-transitive deterministic match criterion, and a probabilistic match criterion. An example is given of the record-pairs generated for the four records using the transitive deterministic criterion and the application of the remaining matching criteria. The presumption is that there is no additional record that matches the four records on the basis of the transitive deterministic criterion. It should not be assumed there is no additional record that matches any on the basis of the remaining matching criteria. The record-pairs in a partition and the records inclusive to that set of record-pairs are a subgraph of the whole graph. The records are shown diagrammatically arranged as a quadrilateral and where the edges between the records are depicted consistently with the information provided in the tables as to which criteria are met. For FIG. 3, two records are defined as matching if the two records meet all three criteria simultaneously. Firstly, all record-pairs that meet the transitive deterministic criterion are generated. Then, each record-pair is assigned a record-pair key defined by the transitive deterministic match criterion and then are partitioned into partitions of record-pairs that share the record-pair key, that is, a common record-pair key. This step divides the problem of determining record-groups for all one million records into determining record groups for each subset of records and record-pairs associated with each partition of record-pairs. As noted in the right table of FIG. 3, a partition of six record-pairs that share the record-pair key 'A1' are processed. In this example, a first pair of records, Record 1-Record 4, is both probabilistically matched and non-transitively-deterministically matched. A second pair of records, Record3-Record 4, is also both probabilistically matched and non-transitive-deterministically matched. Accordingly, all but the first and last record-pair in the table can be removed from further processing. According to embodiments of the disclosure, the first pair of records is deemed to constitute a first logical group, while the second pair of records is deemed to constitute a second logical group. Said differently, the criteria for formation of a logical group is determined in the following fashion.

Given one commonly applied definition of matching, if every record in a set of records matches every other record, then the set of records forms a clique, in accordance with the terms used in graph theory. If this set cannot be expanded and still be clique, then the set is maximal clique. Alternately, if every record in a set of records can reach every other record by traversing through some chain of intermediate records also in the set that sequentially match pairwise, then the set of records forms a connected component, in accordance with the terms used in graph theory. If this set cannot be expanded and still be a connected component, then the set is said to be a maximal connected component. Maximal connected components include, in their definition, single records that did not match any other record, which therefore are record groups of one record.

For brevity, records in a maximal connected component that do not match are referred to as indirectly matched. All cliques are connected components, but not all connected components are cliques. All pairs of records match in a clique, while some pairs of records do not match in a connected component that is not a clique.

In accordance with the above conventions, a set of records where every record matches every other record in the set may be deemed a clique, and a clique is a logical record group. The record group associated with a clique is referred to in this embodiment as logical, because if the matching criterion was 100% accurate, and every record belonged to the same entity, then we should expect every record to match every other record. In this case, the two aforementioned record-pairs of FIG. 3 each constitute a logical record group. Thus, as detailed below with respect to FIGS. 4A-4C, a record pair partition may be one or more maximal connected components, that is deemed to be a not-clique in some circumstances. In these circumstances the records and record-pairs may be subject to one or more operations to extract the set of maximal connected component, which correspond to a plurality of new record groups. Each maximal connected component found may then also be or not be a clique. In the example of FIG. 3, the record group of record1, record2, record3, record4 is a not-clique, and may be further processed according to the present embodiments to generate the two maximal connected components, which then correspond to the two new record groups—Record1-record2 and Record4-record3, as shown. In this case, the two new record groups are maximal connected components and are cliques, for the reasons detailed below.

More expansively, as illustrated in the examples of FIG. 4A-C, a set of records may be deemed to be logical record group when the record group is a maximal connected component that is also a clique. In FIG. 4A-C, there are shown multiple other scenarios for the four records of FIG. 3. In FIG. 4A-C, two records are again defined as matching if the two records meet all three criteria simultaneously. In FIG. 4A, every pair of records matches. All six record-pairs of the original partition are matches, meaning there are six edges. The four records form a maximal clique and a single logical record group.

Said differently, when processing a specific partition of record pairs, where every record-pair in the partition meets the full match criteria, the partition of record-pairs and their associated records can be uniquely subdivided into a set of maximal connected components. Each maximal connected component may subsequently be deemed to constitute a clique according to the present embodiments when $E=N*(N-1)/2$, where N represents a number of records within the maximal connected component and E represents the number of matching record-pairs within the maximal connected component. Thus, in the example of FIG. 5A, there are $N=4$ records, and a total of $E=6$ unique record pairs that are P+D matched to one another (1-2, 1-4, 1-3, 2-3, 2-4, and 3-4). Thus, the above formula substitutes to $6=4(4-1)/2$, or $6=4(3/2)$, which is correct. Accordingly, the record group of four records of FIG. 4A will be determined to constitute a single logical record group or clique, within the meaning of the present embodiments.

In accordance with embodiments of the disclosure, a set of records may be deemed an illogical record group when the set is a maximal connected component but not a clique. Notably, in many instances, subdividing large group of records, such as financial records, into groups representing single entities may result in generating a small fraction of record groups that are maximal connected components but are not cliques or logical record groups. Said differently, most record groups representing a single entity may be determined to be logical groups. However, if at least two records in a record group are insufficiently probabilistically matched or non-transitive deterministically matched to one another, the record group will not constitute a logical group or clique.

A maximally connected component is not a clique (also referred to herein as a "not-clique") when $E<N*(N-1)/2$, where N represents a number of records within the maximal connected component and E represents the number of matching record-pairs within the maximal connected component. The record group associated with a maximal connected component that is not a clique is referred to as illogical, because if the matching criterion was 100% accurate, illogical record groups would not occur. In some cases, on the order of just 1% of paired and bunched record groups may generate illogical record groups. However, these record groups may require special treatment to ensure all records are properly treated before merging and final deduplication.

FIGS. 4B, and 4C present two possible scenarios of illogical and logical record groups, respectively. In FIG. 4B, a set of four records is arranged as a quadrilateral, wherein each record is non-transitive deterministically and probabilistically matched to two different, adjacent, records. Thus, Record 1 matches Record 4 and to Record 2; Record 2 matches to Record 1 and to Record 3; and so forth. In this arrangement, every record matches to every other record, through a path along the perimeter of the quadrilateral. The four records represent a maximal connected component.

However, the maximal connected component is not a clique. Record 2 does not match Record 4, and Record 1 does not match to Record 3. For both these pairs, the non-transitive deterministic and probabilistic matching criteria are not met. In this case, $E=4$ which value is less than 6, the number of edges a clique would contain. This set of records accordingly results in an illogical group, according to the aforementioned definition.

FIG. 4C illustrates an example of four logical groups. In this example, four records are present again, associated with a record-pair partition of six edges. While Record 1 probabilistically matches Record 3 and Record 2 non-transitive deterministically matches Record 4, no record-pair meets the full match criteria. In this case there are four maximal connected components, each of which contains one record ($N=1$) and no edges ($E=0$). $E=0=1*(0)/2$. Thus, these four maximal connected components are trivially also maximal cliques and each record is the sole member of a logical record group. Notably, single record groups are always deemed to be logical record groups, that is, logical single record groups.

Returning to FIG. 2, at block 212 each record group, including logical groups, illogical groups, is assigned a unique entity key. As such, for N number of record groups, N entity keys are assigned. Then at block 214, the merging of record groups takes place where a given record group, having a unique entity key may be merged into a single record.

In the above manner, the entity resolution process of the logic flow 200 is record order invariant. In other words, the order in which the records of an unmerged record group are processed does not impact the number or composition of the final entities created. As discussed above, indirectly matched records may be assigned to the same entity. Even when two different records do not directly match each other, but just indirectly match through a chain of intermediate records that match one another, the two different records are always assigned to the same entity. Said differently, the embodiment of logic flow 200 provides an order-invariant process where firstly record groups are constructed and secondly the rules for combining the two or more records into a final record are applied to the group as a whole. As such, the outcome of the final merging is independent of the order in which records are processed. Accordingly, issues such as missing internal matches creating illogical groups, may be logged for later audit.

Figure 5A:
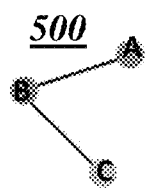
FIG. 5A shows a basic arrangement of records provided by the present embodiments.

To illustrate this order-invariance graphically, FIG. 5A shows a basic arrangement of records provided by the present embodiments. In this example, record A, record B, and record C have been grouped into group 500 after every pair of records has been cross-compared. Record A is matched directly to Record B, while Record B is matched to Record C. The group shows a missing edge, where Record A is indirectly matched to Record C. In this example, the statistic that the group has one edge missing and is an illogical group may be logged. FIG. 5B illustrates a merge operation for the records of the group 500. The merge operation is performed by the merge function F, which function may merge all three records of group 500 into a final representative record for the entity, shown as record D. More generally, the record D may be constructed from any suitable method for prioritizing and combining the information in all the records of group 500. The processing of the individual records, record A, record B, record C, may take place in any order, where the resulting group will take the form of group 500. This group is then processed by a suitable merge operation, to yield the same final record, record D, no matter what order the matching of records and the assembly of group 500 takes place. Said differently, the merge operation reduces each record group (records A, B, C) to a unique single record.

In contrast, when records are merged pair-wise in order at the time of computing a match, then the final outcome becomes dependent upon the order in which the records are processed, as illustrated in FIG. 6A. In FIG. 6A, a first scenario is shown, where a group 600, including record 1, Record 2, Record 3, is processed in the order shown. As such, Record 1 and Record 2, when processed by function F, may yield record "1/2". The new record "1/2" may not match with the record 3, as shown in FIG. 6B. Even if record "1/2 record is found to match record 3 to form a group 610, shown in FIG. 6C, the merging of record "1/2" with Record 3 may yield a record 4, different than a record produced when the Record 1, Record 2, and Record 3 are processed simultaneously.

Moreover, as shown in FIG. 6D, if the same records are evaluated in a reverse order (3, 2, 1), as opposed to (1, 2, 3), a different outcome may arise. Additionally, information is lost that the three records in the group is missing an internal match (see FIG. 6A).

Moreover, if records are merged at the time of a match, and merges are performed just between two records at a time, depending upon the number of records, tens to hundreds of thousands of logical-problem situations may be encountered, as illustrated in FIG. 6E. For example, if the records arrive in the order shown in FIG. 6E, is record 3, which pair-wise matches both Record 2 and 1, to be merged with Record 2 or Record 1?

Figure 7:
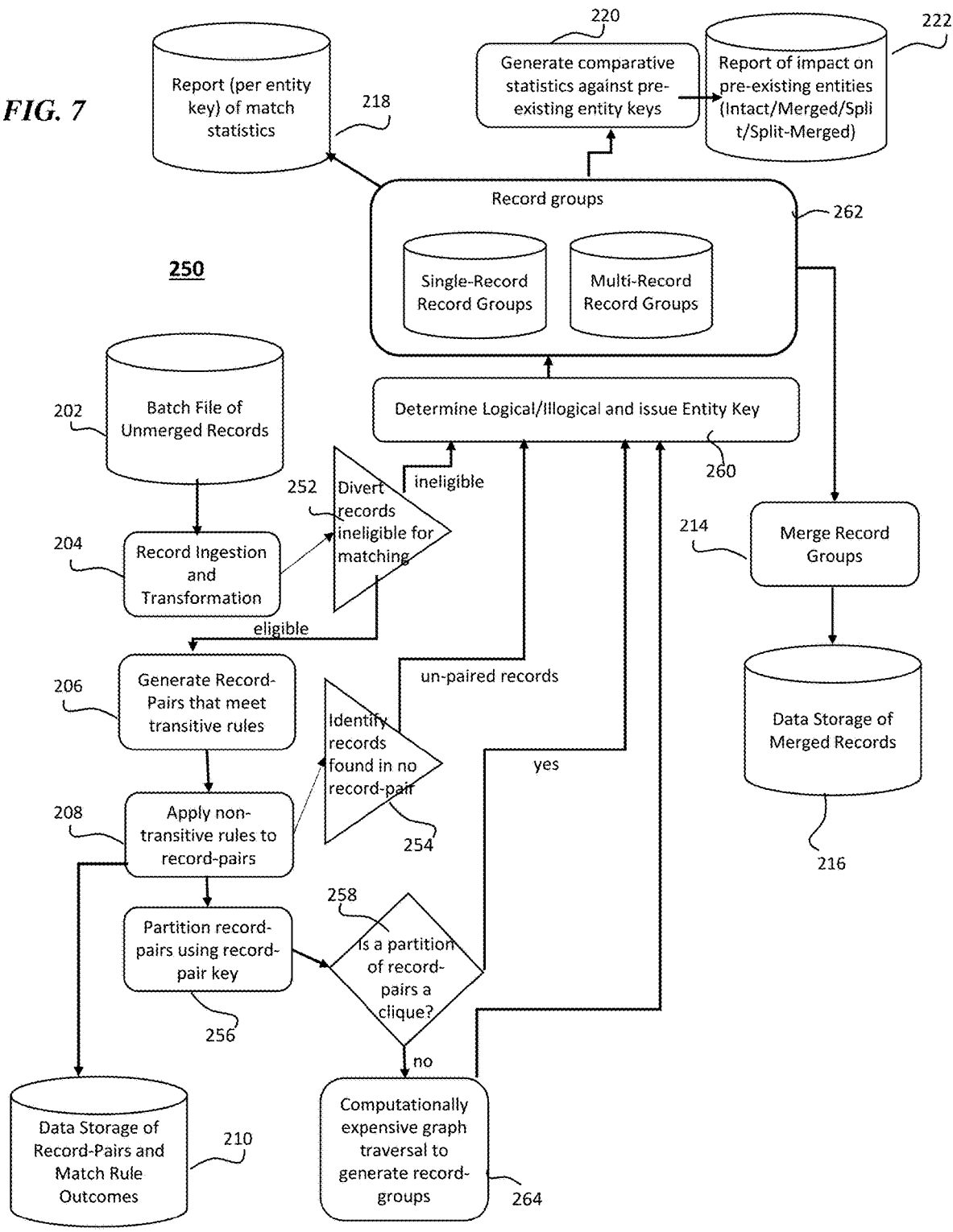
FIG. 7 illustrate an embodiment of a second logic flow.

FIG. 7 illustrates an embodiment of a second logic flow, shown as logic flow 250. At block 202, block 204, and block 206, the operations may proceed generally as described above with respect to FIG. 2. However, in this embodiment, after data ingestion, the flow proceeds to decision block 252, where a determination is made as to whether certain records are ineligible for matching, e.g. is missing required information, or information has not been sufficiently validated, or the record has been flagged as being suspicious. If ineligible, the flow proceeds to block 260, issued an entity key and tagged as logical and then then the flow proceeds to block 262 where record groups (including single record groups) are stored in a record database, such as in a non-transitory computer readable medium. If eligible, the flow proceeds to block 206, described above. In this embodiment, the generation of record-pairs takes place for all records that are deemed eligible for matching.

In the logic flow 250, if a record is paired with another record, the flow moves to block 208, described above. The flow then proceeds to decision block 254, where records are identified that do not match (do not pair) with any other records. The records in FIG. 4C are examples of records that would be identified as this stage. For these unmatched records, the flow proceeds to block 260, they are issued an entity key and tagged as logical and then then the flow proceeds to block 262 where record groups (including single record groups) are stored in a record database.

Only record-pairs that meet the full match criteria in block 208 may proceed to decision block 256. In this operation, partitions of record-pairs are created by grouping record-pairs that share a record-pair key. The flow then proceeds to decision block 258, where a determination is made as to whether a given partition constitutes a clique. Recall the structure of a clique described above with respect to FIG. 5A. For those partitions that are determined immediately to constitute a clique, the flow proceeds to block 260, issued an entity key and tagged as logical and then then the flow proceeds to block 262, where the record groups are stored in a database of all record groups, such as a non-transitory computer readable storage medium. In some examples, most of the records that are classified into multiple-record groups, such as 40-50% of all records, may end up immediately being classified into cliques. Just a small fraction, such as 1%, may constitute a maximal connected component that is not a clique.

At decision block 258, if a given partition of record-pairs does not constitute a clique, the flow proceeds to block 264, where a graph traversal procedure is performed. FIGS. 3 and 4B represent examples where partitions of record-pairs would be determined to not be cliques. As shown in FIGS. 3 and 4, a group of records may be represented by vertices in a graph, where the graph traversal is performed to visit each vertex. As a result of the graph traversal, maximal connected components are extracted. The flow then proceeds to block 260, where a determination is made as to which of the maximal connected components is a clique (and therefore the multi-record group is logical) or not a clique (and therefore the maximal connected component is illogical) is made and an entity key is issued.

To elaborate further, possible outcomes of the graph traversal in block 264 may include determining that the partition represents a single illogical group (e.g. FIG. 5B), or that the partition represents multiple logical groups (see FIG. 4). Any number of maximal connected-components (up to the number of records in the partition) and combination of logical and illogical groups may be determined as result of this operation. Although the graph traversal operations of block 264 may be computationally expensive, the fraction of all records from an unmerged record set that are paired with other records, partitioned into partitions, and then not immediately determined to be part of a clique may be on the order of only 1% to several percent of all records. The fraction of records that requires this more computationally expensive step will reflect both the presence of multiple-record entities with conflicting data in the unmerged record data set and the accuracy of the full match rules applied. Accordingly, by systematically culling out un-matched records and cliques, which can be identified by quick numerical tests described above instead of graph traversal, just a small fraction of the records require the expensive graph traversal step to be properly classified, resulting in a more computationally efficient process.

The flow then proceeds to block 262, where these additional multi-record groups are stored in a database of all record groups. Again, a unique entity key issued in block 260 is stored with each record group at block 262.

After block 262, the flow proceeds to block 214, and then to block 216, described above.

In some implementations of logic flow 250, the flow may also proceeds to optional block 220, and then to 222 as described above.

Optionally, after block 262, the logic flow 250 may also proceed to optional block 218, as is described above.

In summary, the present embodiments provide novel and inventive approaches to collapse (deduplicate) large unmerged record sets, such as record sets including up to several hundred millions of records, or more. In particular, a record set of 250 million records may be collapsed into a much smaller number of entities, such as approximately 100 million, using a combination of scoring methods and rule-based matching resolution. Notably, according to various embodiments, all decisions supporting a collapsing of a record set may be retained for audit and analysis. Advantageously, records that are matched to one another indirectly, may be collapsed into the same entity. Said differently, even if two records do not match one another directly, but match merely through a chain of intermediate records, these two records are nevertheless always assigned to the same entity.

Moreover, in accordance with various embodiments, all matching information may be retained, for example, information to explain why two records have been assigned to the same entity is retained, Non-limiting examples of such information include individual record data transformations, matching details for all pairs of records that constitute a given entity, and the complete structure of a graph of matching records for a given entity.

The present embodiments also provide the advantage that problematic entities are readily identified, such as multi-record groups where a large number of records are matched to one another only indirectly. Such entities may be prioritized candidates for review. The present approach identifies such entities and provide a metric of pathology, such as what fraction of direct matches are missing. Moreover, sufficient data is retained to support sensitivity analysis of the matching process, where matching often involves assigning scores and arbitrary cutoffs that divide matches from non-matches. Thus, by retaining sufficient information, sensitivity analysis may be performed to assess the cut-off value, assessing how many entities are impacted by the rules versus the scoring method. Additionally, in embodiments comparing results of known entity resolution methods, to the entity resolution performed according to the procedures described herein in optional block 220, various metrices may be generated, such as:

1) what fraction of the entities are the same between the two methods; e.g., exactly the same group of records are considered a single entity (e.g., record group) by both systems;

2) What fraction of entities from the known system are merged into entities according to the entity resolution procedure of the present embodiments.

3) What fraction of entities from the known system are split into multiple entities according to the entity resolution procedure of the present embodiments.

4) What fraction of entities from the known system are split into multiple entities and merged into new entities according to the entity resolution procedure of the present embodiments.

In addition to retaining the details of record-pairs that do not meet the full matching requirement, in some embodiments of the disclosure a table of scores for record-pairs that do not meet the full match requirement is generated. Such a table advantageously enables exploration and generation of lower-certainty entities from the original record set. This table may be generated for record-pairs that match on a prescribed partial set of record attributes.

Figure 8:
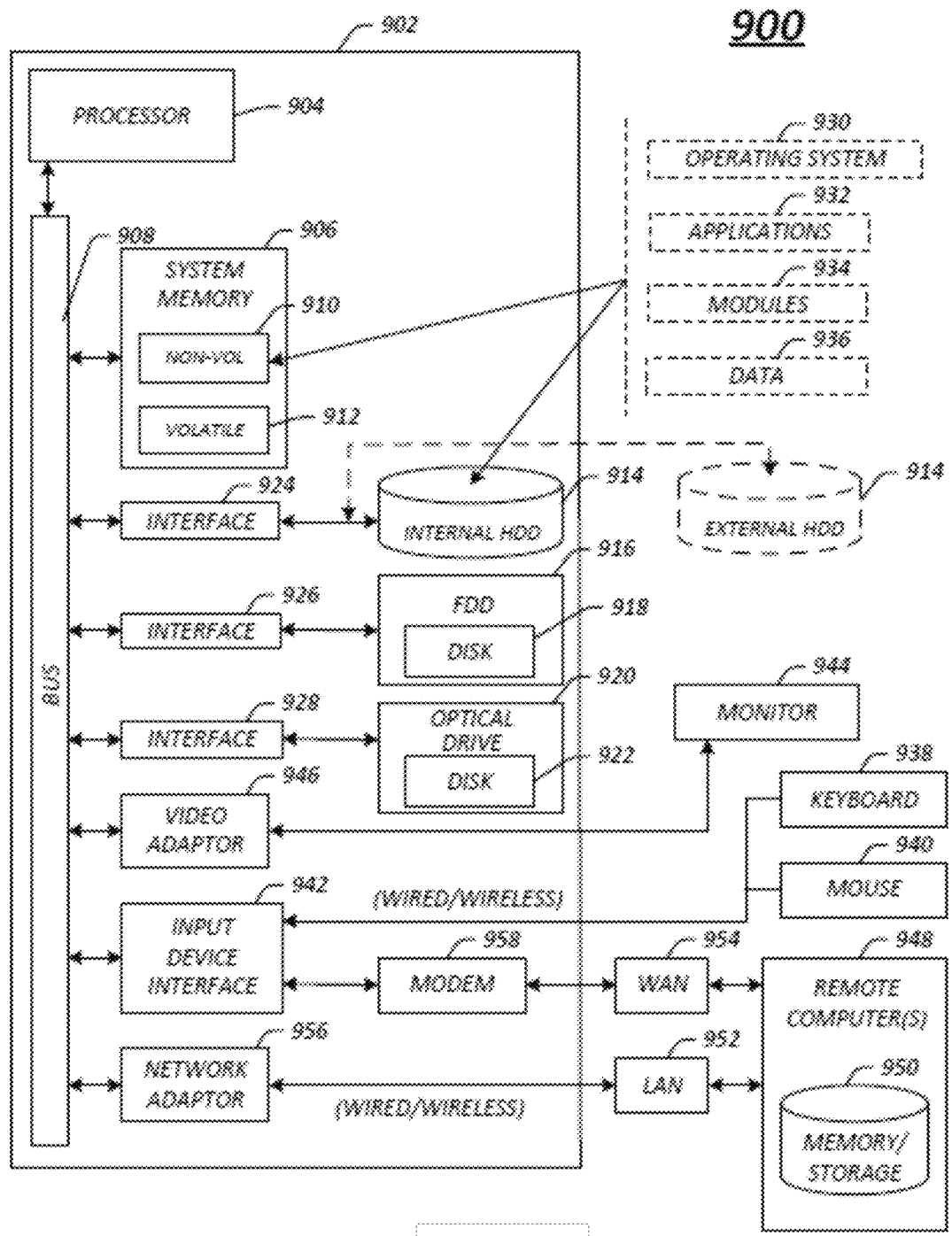
FIG. 8 illustrates an embodiment of a computing architecture.

FIG. 8 illustrates an embodiment of a computing architecture 900 comprising a computing system 902 that may be suitable for implementing various embodiments as previously described. In various embodiments, the computing architecture 900 may comprise or be implemented as part of an electronic device. In some embodiments, the computing architecture 900 may be representative, for example, of a system that implements one or more components of the entity resolution system 100. More generally, the computing architecture 900 is configured to implement all logic, applications, systems, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 902 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 902.

As shown in FIG. 8, the computing system 902 comprises a processor 904, a system memory 906 and a system bus 908. The processor 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 904.

The system bus 908 provides an interface for system components including, but not limited to, the system memory 906 to the processor 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computing system 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies. The computing system 902 is generally is configured to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units (910, 912), including an operating system 930, one or more application programs 932, other program modules 934, and program data 936. In one embodiment, the one or more application programs 932, other program modules 934, and program data 936 can include, for example, the various applications and/or components of the entity resolution system 100, e.g., the record-pair generation engine 114, record group generation engine 116, and/or record group merge entigine 118.

A user can enter commands and information into the computing system 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computing system 902. In addition to the monitor 944, a computer typically includes other peripheral output devices, such as speakers, printers, and so forth.

The computing system 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computing system 902, although, for purposes of brevity, just a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computing system 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computing system 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computing system 902, or portions thereof, can be stored in the remote memory/storage device 950. It will be appreciated that the network connections shown are exemplary and other means of establishing a communications link between the computers can be used.

The computing system 902 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, sub-routines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A non-transitory computer-readable storage medium storing computer-readable program code executable by a processor to:
   receive an unmerged record set, comprising a first plurality of data records;
   perform a record-pairing operation to generate a set of record-pairs from the first plurality of data records, based upon a set of transitive deterministic matching criteria, wherein at least one transitive deterministic matching criteria in the set of transitive deterministic matching criteria is transitive over each record-pair in the set of record-pairs;
   apply a set of non-transitive matching rules to the set of record-pairs;
   perform a partitioning operation on the set of record-pairs, using a plurality of independent grouping operations, wherein after application of the set of non-transitive matching rules and the partitioning operation, a plurality of matched record groups are generated;
   determine a set of maximal connected components from the plurality of matched record groups;
   perform a merge operation on the set of maximal connected components to generate a set of merged records, the set of merged records comprising a second plurality of data records, less than the first plurality of data records; and
   send the set of merged records for storage in a non-transitory computer readable storage medium.

2. The non-transitory computer-readable storage medium of claim 1, the computer-readable program code executable by the processor to determine the set of maximal connected components by:
   identifying a set of cliques and a set of not-cliques within the set of maximal connected components,
   wherein a maximal connected component constitutes a clique when immediately classifiable as a logical record group, wherein a maximal connected component constitutes a not-clique when a more computationally expensive operation is required to classify the maximal connected component into a record-group as a logical record group or an illogical record group.

3. The non-transitory computer-readable storage medium of claim 1, the computer-readable program code executable by the processor to:
   apply, before the partitioning operation, the non-transitive matching rules on the set of record-pairs by:

applying a set of non-transitive deterministic matching criteria to the set of record-pairs;
applying a non-transitive probabilistic matching model to the set of record-pairs; and
storing outcomes of the applying the non-transitive deterministic matching criteria and the applying the non-transitive probabilistic matching model to the set of record-pairs.

4. The non-transitory computer-readable storage medium of claim 2, the computer-readable program code executable by the processor to: send for storage a set of statistics of the record-groups, including a number of records per group, a number of matches per group, and a number of non-matched record-pairs per group.

5. The non-transitory computer-readable storage medium of claim 1, the computer-readable program code executable by the processor to perform the partitioning operation by:
generating a set of record-pair partitions, wherein a given record-pair partition of the set of record-pair partitions includes a plurality of record-pairs sharing a common record-pair key;
applying the non-transitive matching rules to the record-pairs and dropping record-pairs from the record-pair partition that do not pass;
after the applying, determining if a subgraph represented by the record-pair partition constitutes a clique, wherein the record-pair partition constitutes a clique when $E=N*(N-1)/2$, where N represents a number of records within the record-pair partition and E represents a number of record-pairs within the record-pair partition; and
performing a graph traversal of the subgraph represented by the record-pair partition when the record-pair partition does not constitute a clique.

6. The non-transitory computer-readable storage medium of claim 1, the computer-readable program code executable by the processor to:
before the record-pairing operation, determine that a first portion of the unmerged record set is ineligible for matching; and
divert the first portion of the unmerged record set for storage as a first set of single record groups.

7. The non-transitory computer-readable storage medium of claim 6, the pairing operation further comprising:
identifying a set of non-pairing records from the unmerged record set that do not pair with any other records from the unmerged record set; and
storing the set of non-pairing records as a second set of single record groups, wherein the first set of single record groups and the second set of single record groups comprise a set of logical single record groups.

8. The non-transitory computer readable storage medium of claim 6, the computer-readable program code executable by the processor to perform the merge operation on the set of maximal connected components, which correspond to record groups, to generate the set of merged records.

9. The non-transitory computer readable storage medium of claim 8, the computer-readable program code executable by the processor to:
assign an entity key to each record group, each composed of one or more records and each of which corresponds to a maximal connected component; and
perform the merge operation by reducing each record group to a unique single record.

10. A method of merging a record set, comprising:
receiving an unmerged record set, comprising a first plurality of data records;
performing a record-pairing operation on the unmerged record set to generate a set of record-pairs from the first plurality of data records, based upon a set of transitive deterministic matching criteria, wherein at least one transitive deterministic matching criteria in the set of transitive deterministic matching criteria is transitive over each record-pair in the set of record-pairs;
applying a set of non-transitive matching rules to the set of record-pairs;
performing a grouping operation on the set of record-pairs, wherein after the performing the grouping operation and the applying the set of non-transitive matching rules, a set of record groups that constitute a set of maximal connected components is generated;
performing a merge operation on the set of maximal connected components to generate a set of merged records, the set of merged records comprising a second plurality of data records, less than the first plurality of data records; and
sending the set of merged records for storage in a non-transitory computer readable storage medium.

11. The method of claim 10, comprising:
applying the set of non-transitive matching rules to the set of record-pairs by:
applying a set of non-transitive deterministic match criteria to the set of record-pairs;
applying a probabilistic model to the record-pairs to generate a set of scored record-pairs; and
storing a subset of the set of scored record-pairs that meet the set of transitive deterministic matching criteria, as a matched record set, wherein the performing the grouping operation comprises:
performing a partitioning operation on the set of record-pairs, wherein a plurality of independent grouping operations are performed on a set of record pairs of each partition.

12. The method of claim 11, comprising:
sending for storage a set of statistics of the record groups, including a number of records per group, a number of matches per group, a number of non-matches per group, where matching is defined as meeting a full match criteria, including one or more of: transitive criteria, non-transitive criteria, deterministic criteria, and probabilistic criteria.

13. The method of claim 10, comprising:
performing the grouping operation by partitioning the set of record-pairs using a set of transitive deterministic matching criteria, wherein a set of record pair partitions is generated, wherein a given record-pair partition includes a plurality of record-pairs sharing a common record-pair key;
determining if the given record-pair partition constitutes a clique, wherein the given record-pair partition constitutes a clique when $E=N*(N-1)/2$, where N represents a number of records within the given record-pair partition and E represents a number of record-pairs within the record-pair partition, or not a clique when $E<N*(N-1)/2$;
performing a graph traversal of the given record-pair partition when the record-pair partition constitutes a not-clique; and
generating a plurality of new record groups from the given record-pair partition when the given record pair partition constitutes a not-clique, wherein each record group of the plurality of new record groups constitutes a maximal connected component.

14. The method of claim 10, further comprising:
before the record-pairing operation, determining that a first portion of the unmerged record set is ineligible for matching; and
diverting the first portion of the unmerged record set for storage as a first set of single record groups.

15. The method of claim 14, the pairing operation further comprising:
identifying a set of non-pairing records from the unmerged record set that do not pair with any other records from the unmerged record set; and
storing the set of non-pairing records as a second set of single record groups, wherein the first set of single record groups and the second set of single record groups comprise a set of logical single record groups.

16. The method of claim 15, comprising performing the merge operation on the set of maximal connected components and the set of logical single record groups to generate the set of merged records.

17. A system, comprising:
a processor;
a memory storing instructions executable by the processor to:
receive an unmerged record set, comprising a first plurality of data records;
perform a record-pairing operation to generate a set of record-pairs from the first plurality of data records, based upon a set of transitive deterministic matching criteria, wherein at least one transitive deterministic matching criteria in the set of transitive deterministic matching criteria is transitive over each record-pair in the set of record-pairs;
apply a set of non-transitive matching rules to the set of record-pairs;
perform a partitioning operation on the set of record-pairs, wherein after application of the set of non-transitive matching rules and the partitioning operation, a plurality of matched record groups are generated;
generate a set of maximal connected components by sorting the matched record group into cliques and not-cliques via a numerical test, wherein a record group constitutes a clique when immediately classifiable as a logical record group, wherein a record group constitutes a not-clique when a more computationally expensive operation is required to classify the record group into a logical or illogical record group; and
perform a merge operation on the set of maximal connected components to generate a set of merged records, the set of merged records comprising a second plurality of data records, less than the first plurality of data records.

18. The system of claim 17, the memory storing instructions executable by the processor to perform the partitioning operation by:
partitioning the set of record-pairs by applying the set of transitive deterministic matching criteria, wherein a given record-pair partition includes a plurality of record-pairs sharing a common record-pair key;
determining if a record-pair partition constitutes a clique, wherein the record-pair partition constitutes a clique when $E=N*(N-1)/2$, where N represents a number of records within the record-pair partition and E represents a number of record-pairs within the record-pair partition, or a not-clique when $E<N*(N-1)/2$; and
performing a graph traversal of the record-pair partition when the record-pair partition constitutes a not-clique.

19. The system of claim 17, the memory storing instructions executable by the processor to:
generate a plurality of new record groups from a given record-pair partition when the given record-pair partition constitutes a not-clique, wherein each record group of the plurality of new record groups constitutes a maximal connected component;
assign an entity key to each record group of the set of maximal connected components; and
perform the merge operation by reducing each record group to a unique single record.

* * * * *